(12) United States Patent
Parrish

(10) Patent No.: US 6,651,375 B2
(45) Date of Patent: Nov. 25, 2003

(54) HARD BODY WEEDLESS FISHING LURE

(76) Inventor: Michael R. Parrish, 417 Eagle Canyon Dr., China Spring, TX (US) 76633

(*) Notice: Subject to any disclaimer, the term of this patent is extended or adjusted under 35 U.S.C. 154(b) by 0 days.

(21) Appl. No.: 09/955,484

(22) Filed: Sep. 17, 2001

(65) Prior Publication Data

US 2003/0051389 A1 Mar. 20, 2003

(51) Int. Cl.⁷ .............................................. A01K 85/02
(52) U.S. Cl. ............................... 43/35; 43/37; 43/42.44
(58) Field of Search ........................ 43/35, 37, 42.08, 43/42.36, 42.41, 42.44

(56) References Cited

U.S. PATENT DOCUMENTS

| | | | | |
|---|---|---|---|---|
| 151,394 A | * | 5/1874 | Huard et al. | 43/35 |
| 1,021,699 A | * | 3/1912 | Norlund | 43/35 |
| 1,173,694 A | * | 2/1916 | Witty | 43/35 |
| 1,464,215 A | * | 8/1923 | Olson | 43/35 |
| 1,537,266 A | * | 5/1925 | Ryan | 43/42.41 |
| 1,670,174 A | * | 5/1928 | Wiersma | 43/35 |
| 1,701,643 A | * | 2/1929 | Stoll | 43/35 |
| 1,739,590 A | * | 12/1929 | Hill | 43/35 |
| 1,758,817 A | * | 5/1930 | Babitt | 43/35 |
| 1,994,878 A | * | 3/1935 | Smith et al. | 43/35 |
| 2,097,221 A | * | 10/1937 | Babbitt | 43/35 |
| 2,143,631 A | * | 1/1939 | Nisses-Gagner | 43/35 |
| 2,205,773 A | * | 6/1940 | Fox | 43/35 |
| 2,281,480 A | * | 4/1942 | Clark | 43/42.41 |
| 2,582,627 A | * | 1/1952 | Gaylord | 43/42.36 |
| 2,667,006 A | * | 1/1954 | Lehmann, Sr. | 43/35 |
| 3,411,233 A | * | 11/1968 | Hopper | 43/35 |
| 3,497,985 A | * | 3/1970 | Margulies | 43/35 |
| 3,646,699 A | * | 3/1972 | Zeman | 43/35 |
| 3,665,634 A | * | 5/1972 | Baud | 43/35 |
| 3,816,953 A | * | 6/1974 | Hameen-Anttila | 43/35 |
| 3,818,626 A | * | 6/1974 | Peippo | 43/35 |
| 4,020,583 A | * | 5/1977 | Gatlyn | 43/37 |
| 4,528,770 A | * | 7/1985 | McDiarmid | 43/35 |
| 4,765,084 A | * | 8/1988 | Braden | 43/34 |
| 4,782,618 A | * | 11/1988 | Rainey | 43/35 |
| 4,827,656 A | * | 5/1989 | Ohnishi | 43/35 |
| 4,873,781 A | * | 10/1989 | Bates | 43/35 |
| 5,367,818 A | * | 11/1994 | Aduana | 43/42.41 |
| 5,491,925 A | * | 2/1996 | Carpenter | 43/35 |
| 5,809,685 A | * | 9/1998 | Mauldin | 43/35 |
| 5,878,524 A | * | 3/1999 | Braden | 43/35 |

FOREIGN PATENT DOCUMENTS

| | | | | |
|---|---|---|---|---|
| GB | 1429940 B1 | * | 3/1976 | |
| JP | 10-248442 B1 | * | 9/1998 | |
| JP | 2001-204304 B1 | * | 7/2001 | |
| SU | 1316616 B1 | * | 6/1987 | 43/42.08 |
| WO | WO-00/25579 A1 | * | 5/2000 | |

* cited by examiner

*Primary Examiner*—Darren W. Ark
(74) *Attorney, Agent, or Firm*—David G. Henry

(57) ABSTRACT

A weedless fishing lure of hard bodied design of multiple embodiments, which is adapted to be connected to a fishing line, the one single hook of which is connected to the lure body by a through shaft and rotates about the shaft, said body containing a cavity large enough to completely house the hooking point of the hook while it is being fished, and having a mechanism to keep the hook hidden until deployment is desired, said hook being deployable to the hooking position by back pressure against the attached fishing line and said hook remaining deployed by back pressure against the attached line.

1 Claim, 5 Drawing Sheets

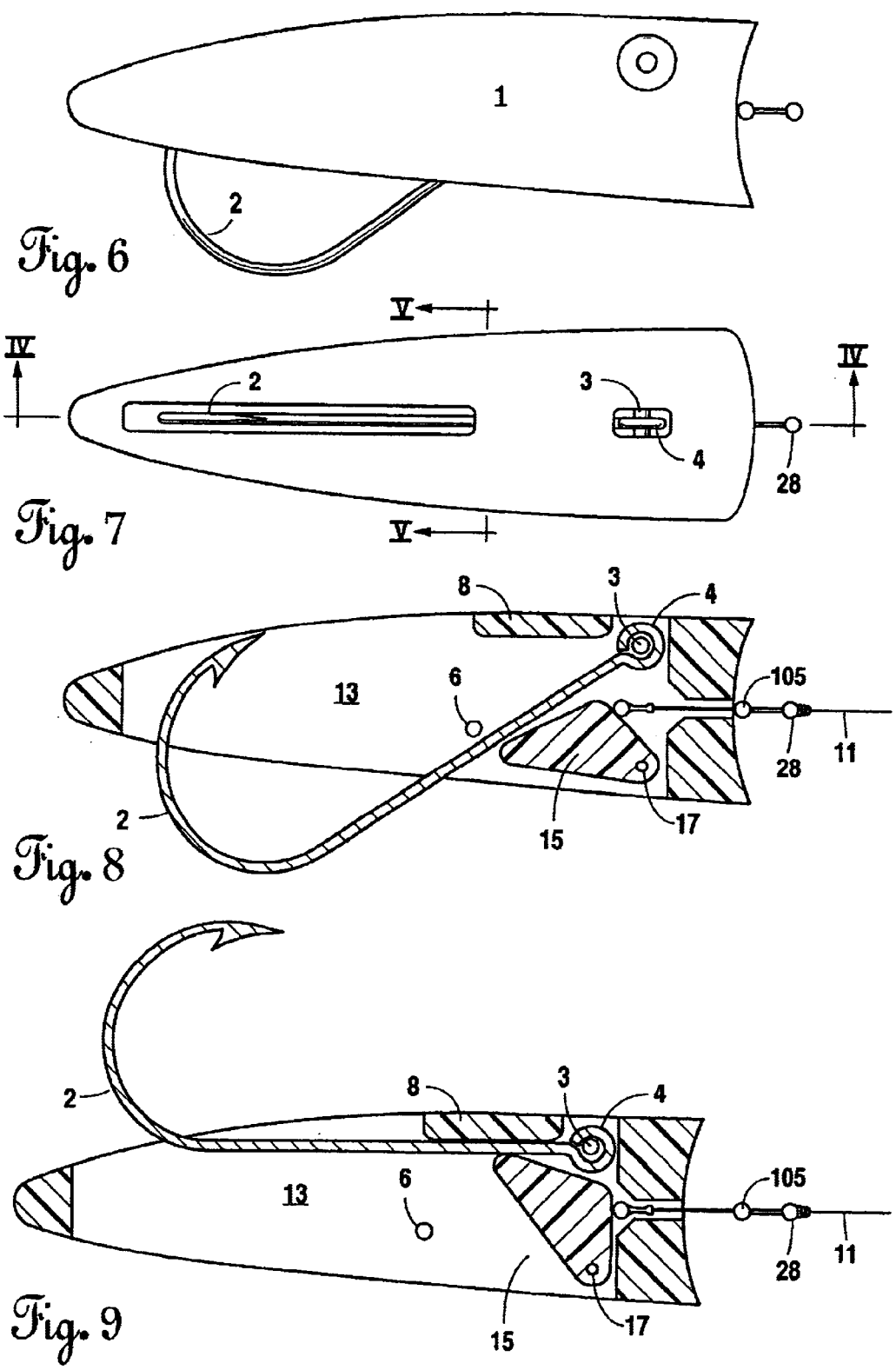

HARD BODY WEEDLESS FISHING LURE

FIELD OF THE INVENTION

The present invention relates generally to hard-bodied artificial fishing lures and specifically to lures with retractable hooks which make them "weedless" or "snagless."

BACKGROUND

Artificial fishing lures are generally designed to mimic the look and action of some species of bait fish. Manufacturers have been building lures of all three types for many years. The bodies have been manufactured from various substances including balsa and other woods, red cedar, plastic, and metal. The shapes are generally designed to imitate bait fish of some bait species. The lures come in almost infinite colors and surface finishes.

Almost since the invention of the first lure of this type ("crank bait", "top water" lures, or "lipless crank bate") manufacturers have used hooks with multiple barbs to "hook" a fish when a strike occurs. Most lures use treble hooks with three distinct barbs, and are suspending from belly or bottom side of the lures.

The dangling hooks on most lures, while effective in securing a catch once a strike occurs, are problematic in other contexts. The dangling hooks are easily entangled in brush, rocks, moss and surface/sub-surface debris, often resulting in loss of an expensive lure.

Manufacturers have tried to make their lures more "weedless" by adding various hook guarding mechanisms. However, hook guards are difficult to install on lures employing multiple, dangling treble hooks. In recent years some manufacturers have attempted to make their lures more weedless by insuring a "nose down" attitude for the lures as they are drawn through the water, and this approach does provide some amount of protection from snags. In top-water applications, on the other hand, some work has been done using soft bodies which protect the hook until the body is compressed in the fishes mouth.

Other approaches to achieving "weedless" lures—those with hidden, or retracted hooks—have their own problems or shortcomings. Most, if not all, such designs, cannot be produced as a single piece casting or two piece casting using current molding and machining technology. Many require intricately designed and machined parts to function, and involved complicated assemblies with many moving pieces.

Designs with retracted, strike-deployed hoods include that of Zeman (U.S. Pat. No. 3,646,699) which employs a single hook that is activated to the hooking position by use of a spring. Braden, in U.S. Pat. Nos. 4,765,084 and in 5,878,524, teaches a mechanism with more than fifty distinct parts. Assembly of those mechanisms into an assembled body would prove costly, tedious, and the end product unreliable. Durability is a problem associated with, or arising direction from some of the just-described designs. The known designs employ springs, cams, levers, and other actuating devices that are soon destroyed by rust, corrosion and breakage.

Another problem with retracted hook designs for "weedless" lures is that of pre-mature hook deployment. Previous designs employ complicated and delicate mechanisms to hold the hook in the retracted position. In U.S. Pat. No. 3,665,634 Baud employs a cam that sets into a detent in the hook body. The force of a cast will dislodge the cam and cause early deployment in normal use. Hameen and Antiua in U.S. Pat. No. 3,816,953 employ a complicated spring and lever mechanism. In somewhat contradictory fashion, another problem is that of keeping a hook deployed, once extended. In U.S. Pat. No. 4,528,770, McDiarmand employs a complicated spring mechanism to deploy the hook, but a spring strong enough to hold the hook in place may cause the hook to fail to deploy upon a strike.

Yet another limitation of existing, "weedless" designs relates to the shape of the end product. To provide room for complicated moving parts the lure bodies are often fattened, elongated, and bulged and the end product has no real resemblance to bait.

Finally, there is the problem with retracted hook lures of depending on non-standard parts. In U.S. Pat. No. 4,528,770, McDiarmand employs a hook that is not standard industry design, as does Bates in U.S. Pat. No. 4,873,781 Bates.

In summary, the existing approaches to making lures "weedless" are only somewhat effective, and true "weedless" construction has not yet been attained.

Lures equipped with treble hooks, whether intended to be "weedless" or not, present several additional drawbacks and problems. A first problem has to do with safety. Once a fish takes the lure into its mouth and becomes ensnared in the hooks, a fisherman is faced with the extraction of the hooks once the fish is landed or netted. To extract the hooks a fisherman must restrain the fish while pulling the hook(s) from the fishes' mouth. Because most lures contain multiple treble hooks, any thrashing or movement of the fish during the extraction can result in the "free" hooks (hooks not caught in the fishes mouth) becoming embedded in the fisherman. Another problem relates to fish being often able to dislodge the treble hooks. This is particularly true of species which are known to leap and thrash their heads back and forth. This is less of a problem when single barb hooks are used, because of their ability to provide a solid hook-up and retention of the fish due to the larger size of the hook and barb.

An advantage of a lure with a single hidden hook relates to storage. Most hard bodied baits have to be stored in separate compartments to prevent tangling. When combined with other treble-hooked lures, hooks become entangles and time is wasted in the untangling process. If the lures are stored in separate compartments, additional storage space and equipment is needed. Lures with a hidden hook could be stored with multiple lures to a compartment with no difficulties.

SUMMARY OF THE INVENTION

In view of the foregoing, it is an object of the present invention to provide an improved, artificial fishing lure.

It is another object of the present invention to provide an improved artificial fishing lure which more effectively than existing design, resists entanglement with weeds and the like during use.

It is another object of the present invention to provide an improved artificial fishing lure of retracted hook design which is more reliable than existing entanglement-resistant ("weedless") lure design.

It is another object of the present invention to provide an improved artificial fishing lure of retracted hook design which is less mechanically complex than existing entanglement-resistant ("weedless") lure design.

It is another object of the present invention to provide an improved artificial fishing lure of retracted hook design which is more escape-resistant than existing entanglement-resistant ("weedless") lure design.

It is another object of the present invention to provide an improved artificial fishing lure of retracted hook design which is less hazardous to users than existing entanglement-resistant ("weedless") lure design.

In satisfaction of these and related objects, the present invention provides an improved hard bodied lure with a single retractable hook, adaptable to multiple configurations, which can be readily manufactured using current molding and machining technology and standard industry parts, and which provides true weedless/snagless operation/use Since most game fish have an affinity for underwater structures such as brush and rocks, being able to fish the lure around and through this type of structure is extremely advantageous.

As will be clear from a review of the Detailed Description, the present design is simple, effective, and addresses each of the problems enumerated above in the Background. The present design guards the hook while the lure is being fished, and provides for deployment only when the fish strikes. This is accomplished via a cavity in the body of the lure. The cavity is large enough to house the hooking point of the single attached hook. The hook retention mechanism keeps the hook from deploying until the fisherman desires the hook to deploy and creates a source of biasing force to deploy the hook upon demand.

The present design addresses safety concerns described above by using a single barb hook, and in like manner addresses the dislodging problem of treble hooks. The simplicity of the mechanism allows for outer contours which meet whatever shapes are desirable for optimum fish attraction. The bodies of lures of the present design may be readily produced with molding technology employed by the industry today as a single piece or two piece casting, or as a single or two piece machined unit of wood, metal, or plastic using current machining and lathe technologies such as CNC machines. The present design is, mechanically speaking, very simple, and not prone to mechanical failure nor to rust or other deterioration. This same simplicity is beneficial from a cost of manufacturing standpoint. Other benefits of embodiments of the present invention will be apparent from an understanding of the specification and associated drawings.

BRIEF DESCRIPTION OF THE DRAWINGS

FIG. 6—A side view of a top-water embodiment showing the hook in the hidden position.

FIG. 7—A top view of a top-water embodiment showing the hook in the hidden position.

FIG. 8—A sectional view of a top-water embodiment showing the right body half of the lure and cam detail with the hook in the hidden position.

FIG. 9—A sectional view of a top-water embodiment showing the hook in the exposed or deployed position.

DETAILED DESCRIPTION OF THE PREFERRED EMBODIMENTS

Figure 1:
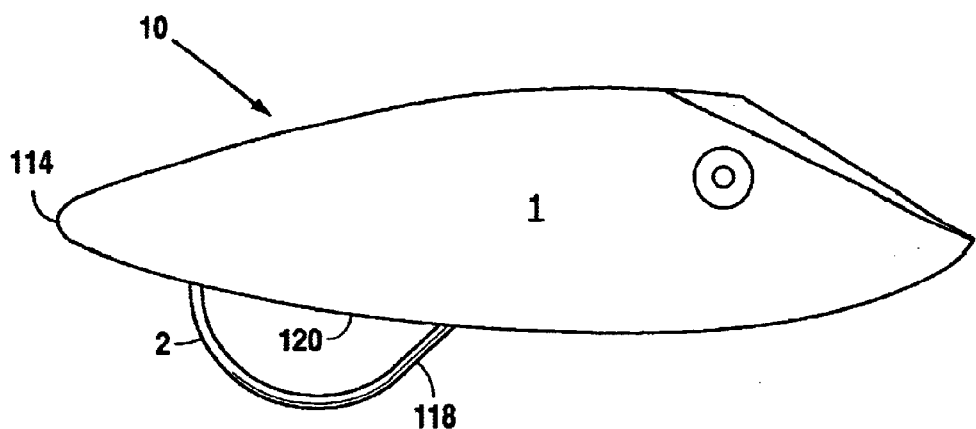
FIG. 1—A side view of the preferred embodiment of the lure showing the hook in the hidden position.
Figure 2:
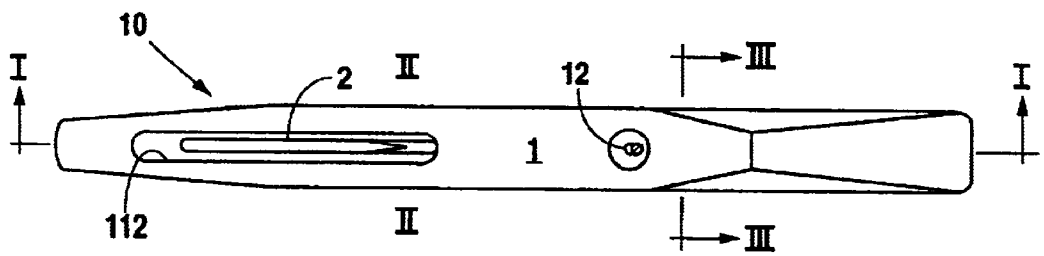
FIG. 2—A top view of the preferred embodiment showing the line aperture and upper cavity slot.
Figure 3:
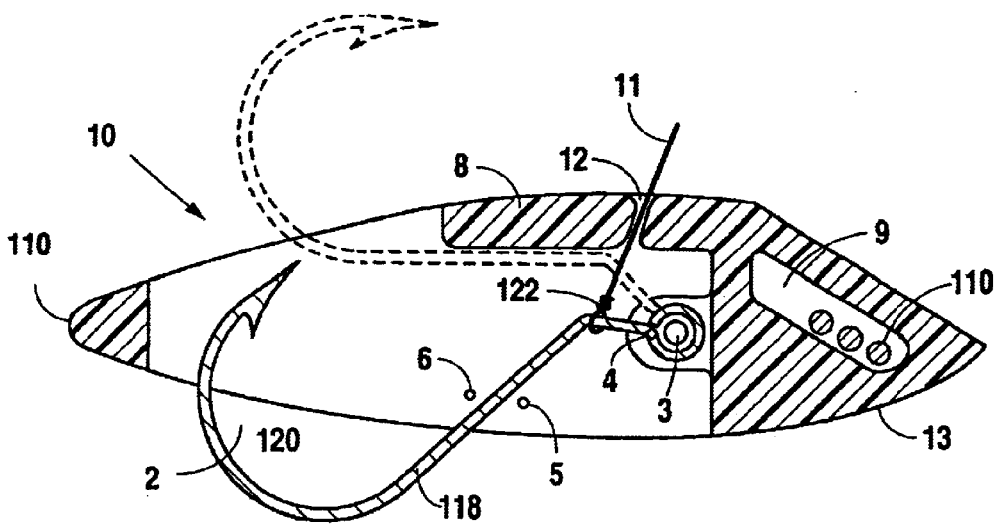
FIG. 3—A sectional view of the preferred embodiment showing the right body half (viewed from the nose) of the lure. This view also supplies hook mount detail.
Figure 4:
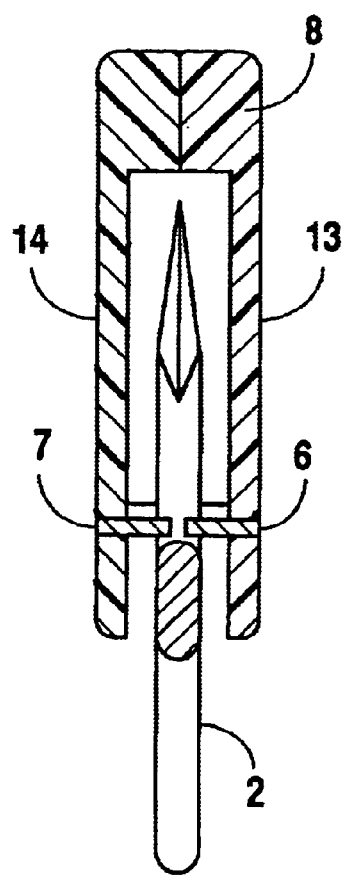
FIG. 4—A sectional view of the preferred embodiment taken across the hook keepers showing hook keeper detail.
Figure 5:
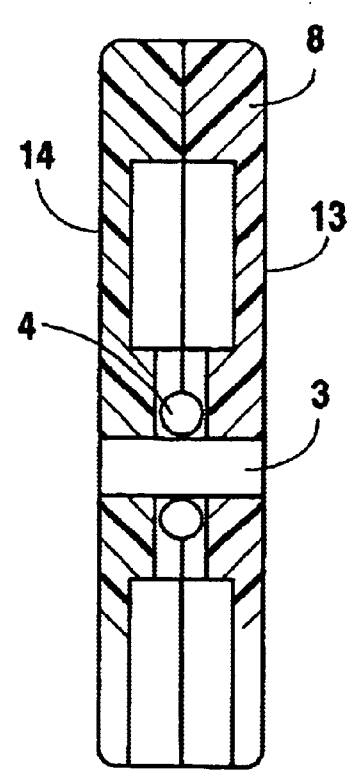
FIG. 5—A sectional view of the preferred embodiment taken across the hook shaft showing hook mounting detail.

Referring principally to FIGS. 1–5, the preferred embodiment of the present fishing lure is identified generally by the reference number 10. Lure 10 includes a lure body (1) is composed of two halves (13 and 14) which are manufactured with a recess on the inner surface of each half of a depth of approximately one and one half times the diameter of the hook shaft. (The two halves 13 and 14 may be molded plastic or may be machined from wood or metal on a CNC machine or comparable equipment). When the two halves 13 and 14 are joined this creates a cavity 112 through which hook 12 may rotate freely about the hook shaft 3. The cavity 112 opens through the top side of the lure body 1 with an origination of the opening a short distance from the tail 114 of the lure body 1 and a termination at approximately mid point of the body 1. The cavity 112 is wide enough to accommodate the body of hook 2 and to allow for hook keepers 6 and 7 penetration into the cavity 112. The cavity 112 lies equidistant and parallel to the head-to, tail centerline of the lure 10. The cavity 112 opens through the bottom side 116 of the lure body 1 with an origination the same as the top cavity opening and terminates at a point approximately mid-way between the head and tail 114 of the lure body 1. This provides an opening through which the shank 118 of the hook 2 may pass when it is placed into the "hidden" or "set" position (as shown in FIG. 1). All inner corners and exposed edges inside the cavity 112 should be slightly rounded to prevent damage to the fishing line should there be any contact. Hook shaft 3 passes through the approximate middle of the lure body 1, eye 4 of hook 2 and cavity 112 at a point that allows hook 2 to rotate freely upward and downward through the body cavity 112 without any interference between the tail end of the cavity and the bend of the fish hook shank 118.

Hook keepers 6 and 7 extend inward to cavity 112 in the lower quadrant of each half of the lure body 1. Hook keepers 6 and 7 are, in the preferred embodiment, NYLON bristles, but may be made of some other suitable flexible, durable material such as KEVLAR or DELRIN. The NYLON bristles are of approximate diameter 1/16" and are set into holes provided in the body halves 13 and 14.

Figure 14:
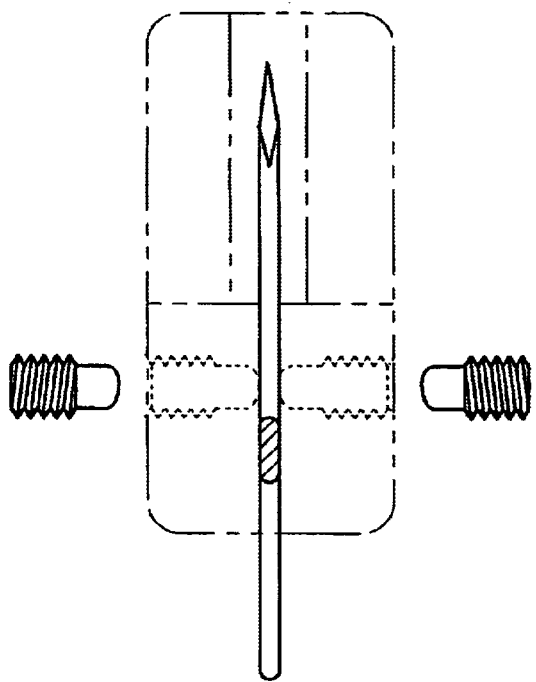
FIG. 14—A sectional view of alternate design hook keepers.
Figure 15:
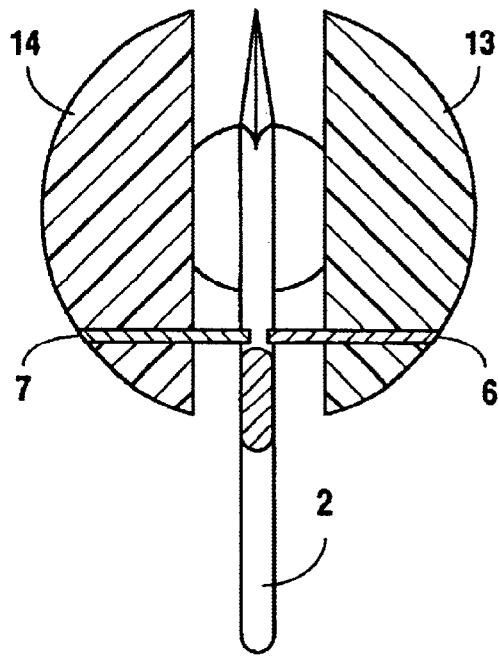
FIG. 15—A sectional view of a top-water embodiment showing hook keeper detail.

Alternative means of retaining the hook may be used. For example, referring to FIG. 14, the hook retainers 6 and 7 may be structured as small screws of DELRIN, NYLON, TEFLON or KEVLAR. The outer ends of such structures should be slightly rounded. The screws (hook keepers 6 and 7) would be screwed into the two body halves 13 and 14 to the proper depth to allow the hook shank 118 to pass between them and adjusted as wear may occur.)

The inner ends of the hook keepers 6 and 7 extend into the cavity 112 of the body 1 to a sufficient distance that their inner end lies short of the head-to-tail centerline of the cavity 112 by a distance equal to approximately ¼ the diameter of the hook 2. Thus, the hook 2 may then be pushed or pulled between the ends of the keepers 6 and 7 as the hook 2 is rotated about the hook shaft 3.

To begin fishing with the lure, a fishing line 11 must be attached to the hook 2. It is assumed that a rod and reel (not shown in the drawings) are used in the operation of the lure 10. The fishing line 11 is passed down through the line aperture 12 provided in the lure body 1. The edges of line aperture 12 are rounded to prevent damage to the line 11. The hook 2 is pushed up into it's full upward position (shown in dotted line in FIG. 3). The line 11 is then attached to the hook 2 by wrapping it around the exposed, bent portion of the hook shank 118 and is secured via a "double improved cinch knot" or other similar knot 122. The tag ends of the knot 122 are then trimmed as closely as possible. The hook 2 is then pushed down past the hook keepers 6 and 7 into the "hidden" position (shown in unbroken lines in FIG. 3).

Hook 2 is held in the hidden position while the line 11 is pulled upward through the line orifice 12. The knot 122 will slide forward on the hook 2 to a point where it is at or near the downward bend of the hook 2. A lower hook stop 5 is set in the lure cavity 112 and acts as a lower stop to keep the hook 2 from dropping out of the lower cavity opening 120. When the hook 2 is in the "hidden" position it's shank 118 will lie between the hook keepers 6 and 7 and the lower hook stop 5. The lure can then be cast out and retrieved just as any conventional crank bait. A weight cavity (9) is set into the nose of the lure.

Weighted metal balls 110 are placed into a weight cavity 9. The weight thus provided in the indicated position effects a nose-down orientation for the lure 10 while in use in the water, and also provides noise as the balls 110 strike the inside of the cavity 9 as the lure 10 wobbles from side to side during a retrieve.

When a strike occurs the fisherman must draw the rod tip back forcefully and quickly, as is required with most baits, to drive the hook point into the fishes mouth. When the fish holds the lure in it's mouth this creates a back pressure against the line 11. When the rod tip is drawn back forcefully, the line 11 exerts sufficient pressure against the hook 2 to rotate the hook shank 118 upward past the ends of the two hook keepers 6 and 7. The hook 2 rotates upward until the hook shank 118 contacts the lower side of the portion of lure body 1 that serves as an upper hook stop 8. The upper hook stop 8 acts to keep the hook 2 from turning downward toward the lure body. The point of hook 2 is then exposed and is driven into the fish's mouth.

In FIG. 6 a top water embodiment is shown. The manufacture and operation of the lure are much the same as that shown for the embodiment of FIGS. 1–5. The lure 10 in this embodiment uses a cam 15 (shown in FIG. 8) to deploy and supply the upward force for the hook 2. The cam 15 and cam shaft 17 should be made from stainless steel or a durable material such as KEVLAR or a high grade of molded plastic. The cam 15 is supplied with an eyelet 16 for connecting the cam cable 27 to the line attachment eyelet 28. The fishing line 11 is attached to the eye 28 of the cam cable 27. The cam cable 27 is supplied with a crimped ball 105. The ball 105 interacts with body 1 as shown in FIG. 8 to keep the hook 2 and cam 15 from dangling from the body 1 when the hook 2 is in the hidden position. The hook 2 is deployed as in the preferred embodiment. The weight chamber 9 and weighted balls 110 of the earlier embodiment are removed in the embodiment of FIG. 6 and following. The hook keepers 6 and 7 are exactly as in the preferred embodiment.

Figure 10:
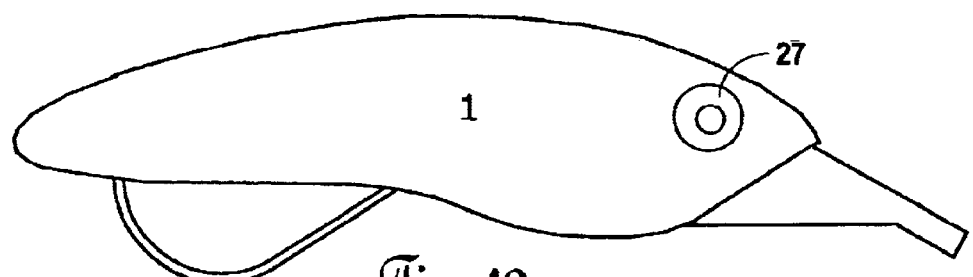
FIG. 10—A side view of a diving embodiment showing the hook in the hidden position.
Figure 11:
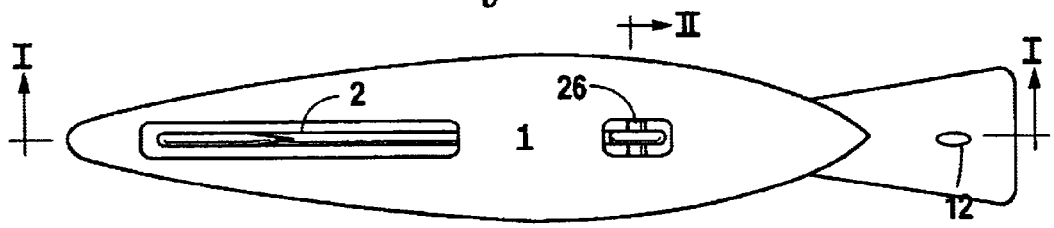
FIG. 11—A top view of a diving embodiment.
Figure 12:
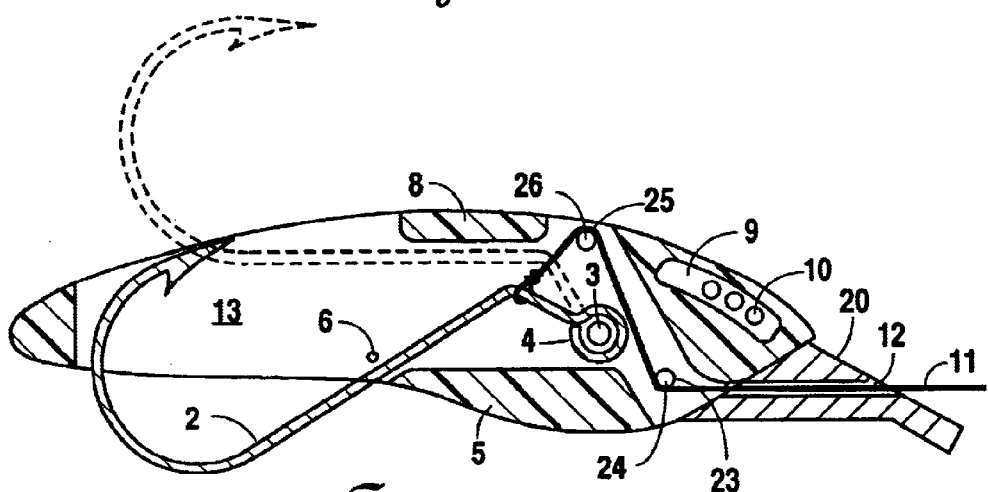
FIG. 12—A sectional view of a diving embodiment showing the hook in the hidden and deployed positions. This view also supplies detail of the line rollers, weight chamber, line aperture, diving bill, and hook mount.
Figure 13:
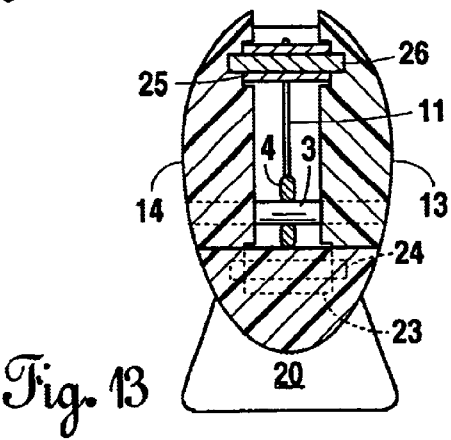
FIG. 13—A sectional view of a "diving" embodiment showing detail of the top line roller.

In FIG. 10, a diving lure embodiment is shown. Two rollers 23 and 25 have been added to route the line 11 into position to supply the upward force to release and expose the hook 2. The line 11 is routed through the line aperture 12 and passes behind the bottom roller 23 (mounted on shaft 24) and forward of the top roller 25 (mounted on shaft 26) and out the opening above the top roller 25. Line 11 is then routed back down through the opening above the upper roller 25 and the line 11 is secured to the hook shank 118 as in the preferred embodiment. The hook keepers 6 and 7 for this embodiment are exactly as in the preferred embodiment.

It becomes apparent from these descriptions that slight variations could be made in the retention and deployment mechanism of the hook 2 depending on the body shape of the lure 10, but it should be understood that the basic design/operation remains the same—that a single hook is placed into and kept in a cavity providing snagless operation until such time that the fisherman desires to deploy the hook, said hook being deployed by back pressure against the attached fishing line.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A weedless fishing lure of hard bodied design comprising:

a body member having a hook shaft extending through an interior cavity formed within said body member, said cavity opening to the outside of said body member;

a fishing hook rotatably carried on said hook shaft whereby said fishing hook is rotatable between a retracted position whereby a hook barb portion of said fishing hook is recessed within said cavity, and a deployed position wherein said hook barb portion of said fishing hook is exposed exteriorly of said body member for capturing fish; and yieldable hook keeping means positioned within said interior cavity for applying a mechanical force against said fishing hook for resisting initial movement of said fishing hook from said retracted position toward said deployed position until a force exceeding said mechanical force is applied to said fishing hook via a fishing line which is attached to said fishing hook in a manner for forcing said fishing hook from said retracted position toward said deployed position when force is applied to said fishing hook, and wherein said yieldable hook keeping means are flexible bristles which extend inside said cavity from opposite sides of said cavity and transverse the path of rotation of said fishing hook so as to contact and impede said fishing hook during rotation of said fishing hook from said retracted position toward said deployed position.

* * * * *